United States Patent [19]

Miller et al.

[11] 4,066,878
[45] Jan. 3, 1978

[54] TIME-DOMAIN FILTER FOR RECURSIVE TYPE SIGNALS

[76] Inventors: Raymond M. Miller, Fredericksburg; John J. Teti, King George, both of Va.

[21] Appl. No.: 671,525

[22] Filed: Mar. 29, 1976

[51] Int. Cl.² .................... H04B 15/00; H04B 1/10
[52] U.S. Cl. .................... 364/724; 179/1 P; 325/477; 328/140; 364/728
[58] Field of Search .......... 235/181, 150.5, 3, 152; 340/146.2; 325/473–477; 179/1 P; 328/138, 139, 140; 307/233 R

[56] References Cited

U.S. PATENT DOCUMENTS 3,684,967  8/1972  Kelly ............................. 328/140

| | | |
|---|---|---|
| 3,801,956 | 4/1974 | Braun et al. .......... 340/146.2 |
| 3,855,576 | 12/1974 | Braun et al. .......... 235/181 |
| 3,855,593 | 12/1974 | Van Hijfte et al. ........ 235/181 |
| 3,881,101 | 4/1975 | Pederson et al. .......... 235/181 |
| 3,882,283 | 5/1975 | Proudfoot ............... 328/138 |
| 3,902,123 | 8/1975 | Oomen .................. 325/474 |

FOREIGN PATENT DOCUMENTS

2,432,371  2/1975  Germany ............... 325/476

*Primary Examiner*—Felix D. Gruber

[57] ABSTRACT

A time domain filter which separates one or more recursive pulse signal trains from other signals, pulses or noise, regardless of whether those signals are recursive or not.

2 Claims, 11 Drawing Figures

FIGURE 4

TIME-DOMAIN FILTER FOR RECURSIVE TYPE SIGNALS

BACKGROUND OF THE INVENTION

Auto-correlation of signals has been feasible for some time, but has generally been reserved for off-line applications due to the cost and complexity of the equipment necessary for implementation of a real-time system. Without auto-correlation it has been necessary to transmit a signal of sufficient power to be received at a power level higher than the background noise to insure a high probability of detection and a low false alarm rate, and it also has been necessary to introduce redundancy so that each data bit or message is repeated enough times to insure reliability.

SUMMARY OF THE INVENTION

The time domain filter is used with recursive pulse or digital signals. The filterng is based upon the principle that past repetitive events can be used to establish the probability for the next event to occur at any given time. Pulse delay devices such as conventional or charge-coupled shift registers, or randon access memories are used to record a dynamic history of signals. If the exact recursive time relationship is maintained, the individual signals need not be from the same source, but can be a combination of signals from multiple sources, such as multiple radar echoes, signals from frequency - diversity communications systems, or multi-channel pulse encrypted signals. The correlation of incoming real-time signals to this dynamic history of previous signals determines if the incoming signal is to be passed or rejected. Since the signals can be passed through the delay devices at a known constant rate, sampling taps at time intervals corresponding to the pulse repetition interval of the signal being sought provide a continual means of time auto-correlation. These time related signals are fed into a circuit which has an output if and only if a predetermined minimum percentage of corresponding signals from the delay taps is exceeded, establishing a sufficiently high probability of occurrence of a valid incoming signal. The output of the correlator gates any incoming signal occuring at the predicted time without time distortion or change of phase to maintain the real-time relationship. Since this gating is done to the real-time signal, an output from the filter occurs only if an incoming signal occurs at the same time as the correlator gate.

The time-domain filter can be sent up as a bandpass filter, a notch filter, or a combination of both. Different signals of the same repetition rate will be simultaneously processed by the filter without interaction or interference, and without regard to their phase relationship. If the filter is provided with variable taps, or with more than one set of taps, it can process signals of different repetition rates, providing a separate output for each signal of different pulse repetition interval. The use of variable delays, such as the variable length shift register allows the filter to be adjusted either manually or automatically to the desired signal repetition interval, or to track a signal of a changing repetition interval. The use of a variable correlator gate length will similarly allow for varying the bandwidth of the filter to optimize the filter response for different quality input signals.

STATEMENT OF THE OBJECT OF THE INVENTION

An object of the invention is to reduce the redundancy of the intelligence transmission and to eliminate the high transmitted power signal necessary to overcome ambient noise.

Another object of the invention is to provide a simple inexpensive system for combining past events with present events without the loss of real-time correlation of the input signal.

Other objects, advantages and novel features of the invention will become apparent from the following detailed description of the invention when considered in conjunction with the accompanying drawings.

BRIEF DESCRIPTION OF THE DRAWINGS

FIG. 3 shows how FIGS. 2A to 2H are interconnected.

DETAILED DESCRIPTION OF THE INVENTION

Figure 1:
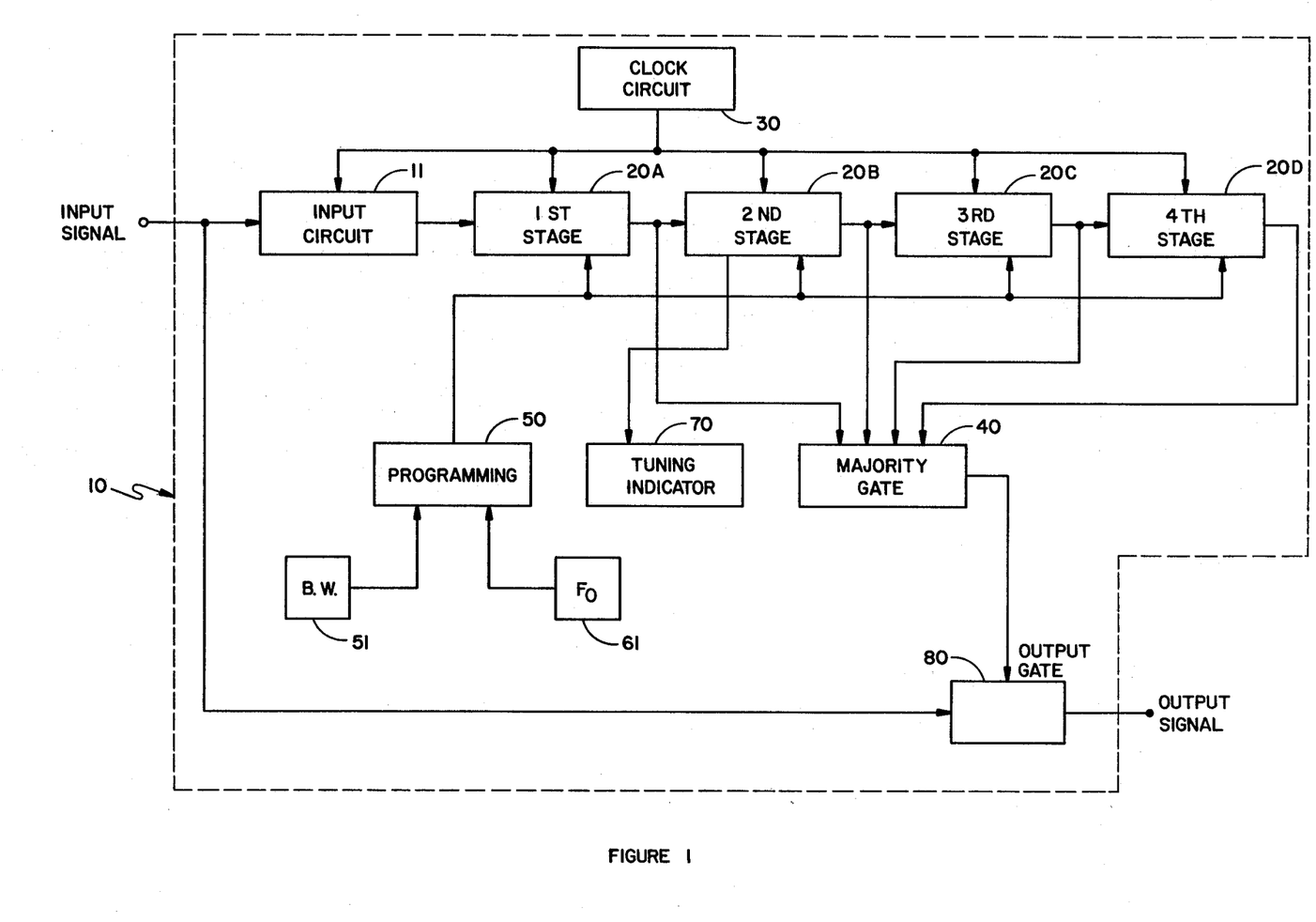
FIG. 1 is a block diagram of a time-domain filter.
Figure 2A:
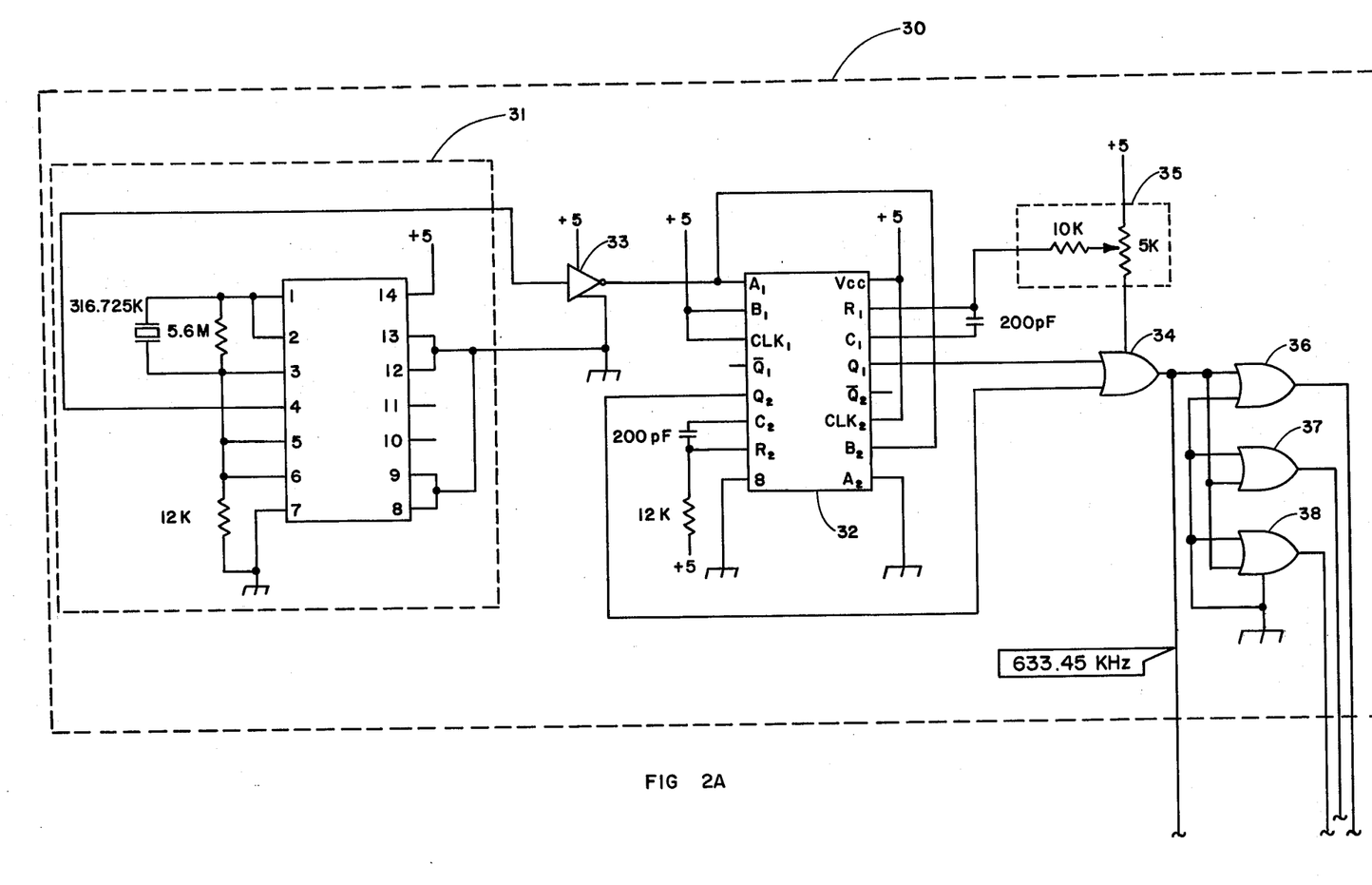
FIG. 2A is a schematic diagram of a time-domain filter.
Figure 2B:
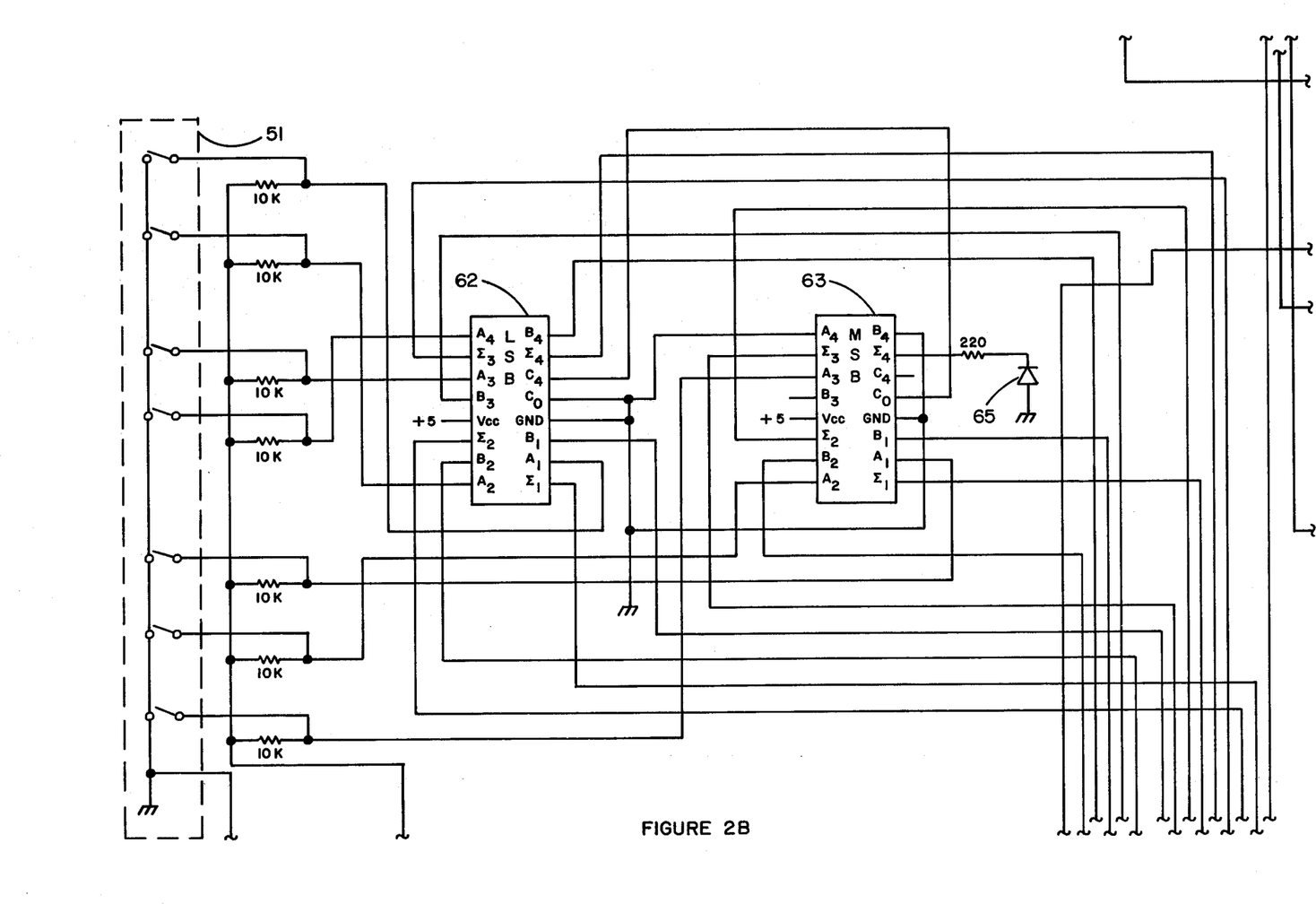
Figure 2C:
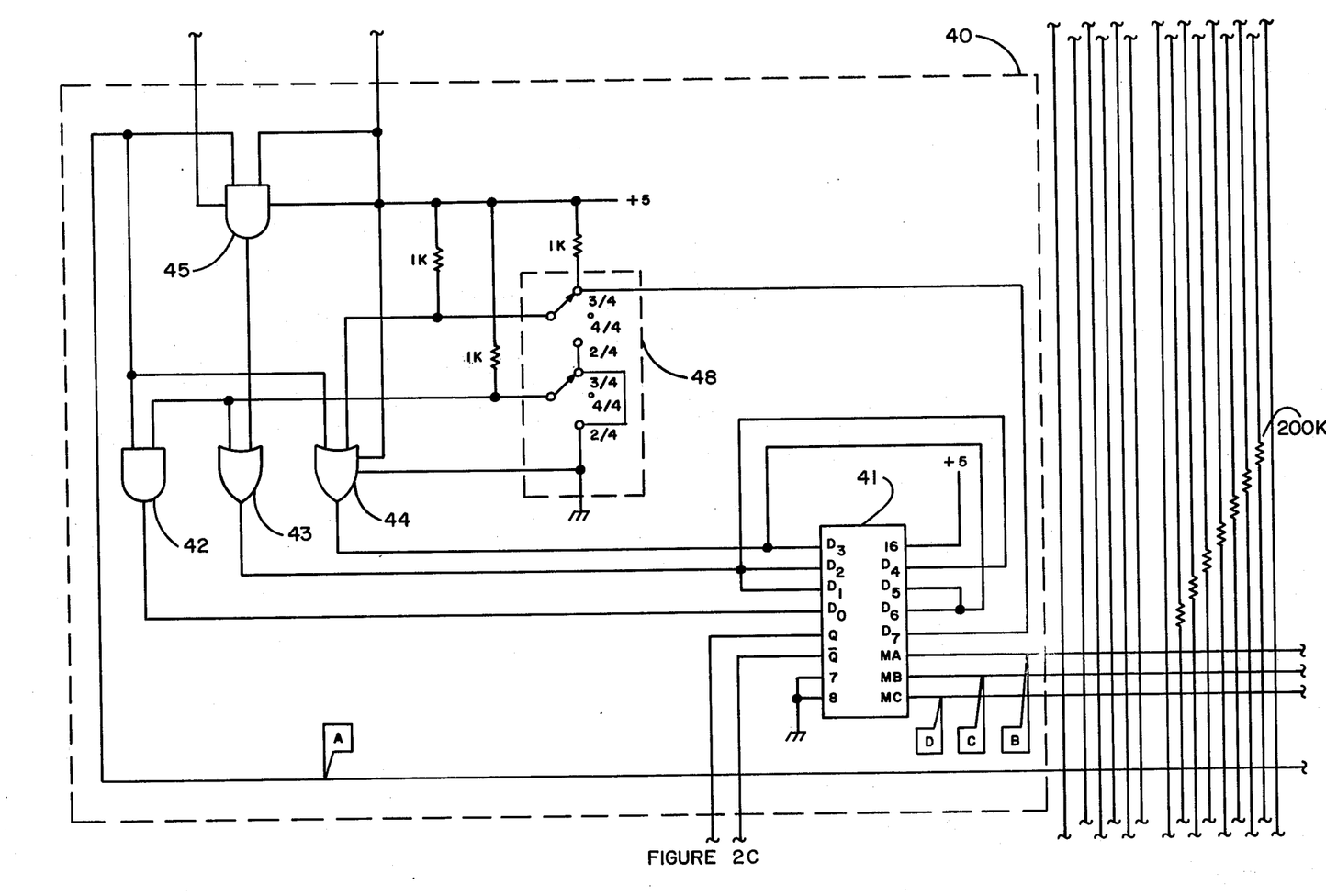
Figure 2D:
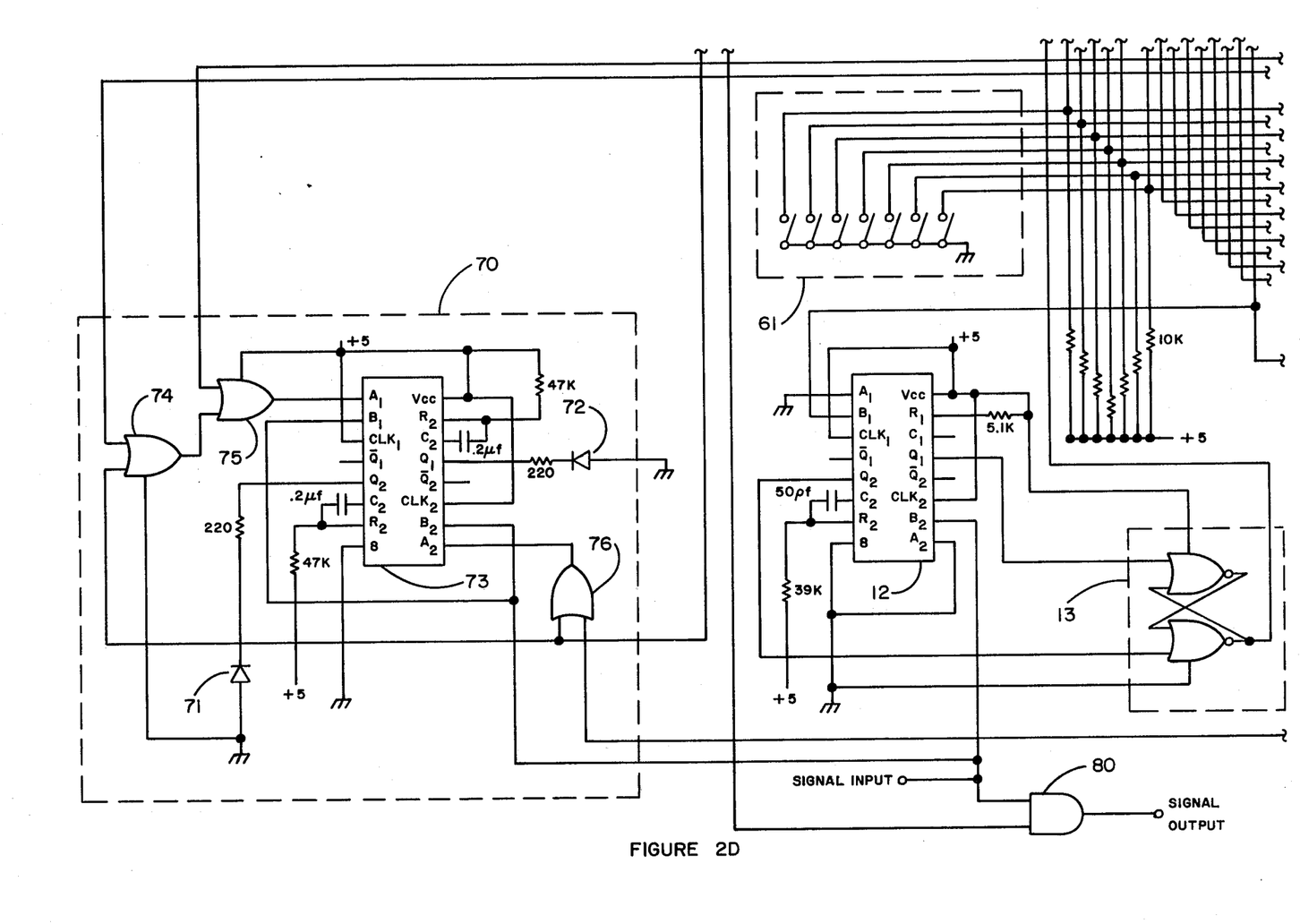
Figure 2E:
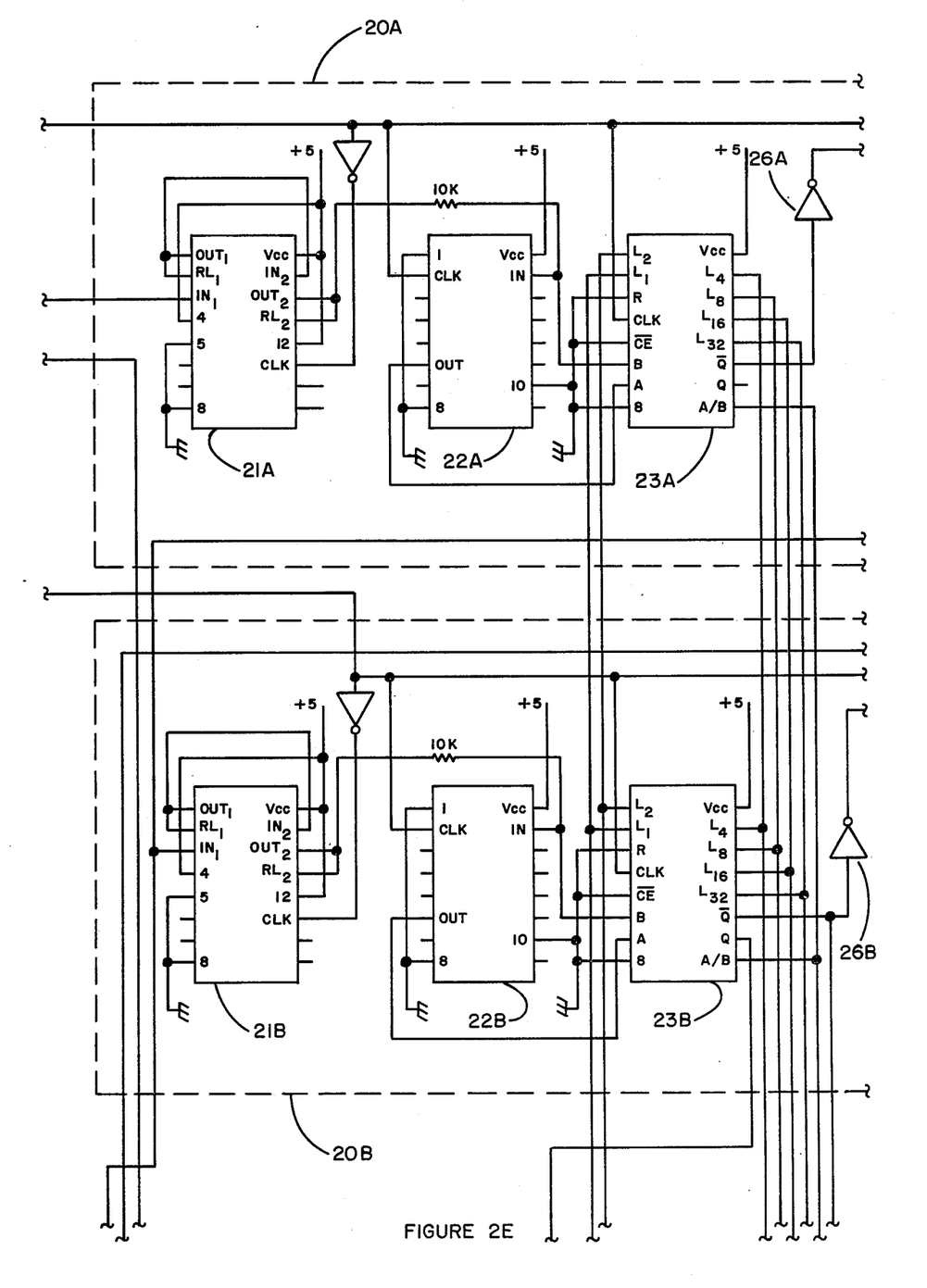
Figure 2F:
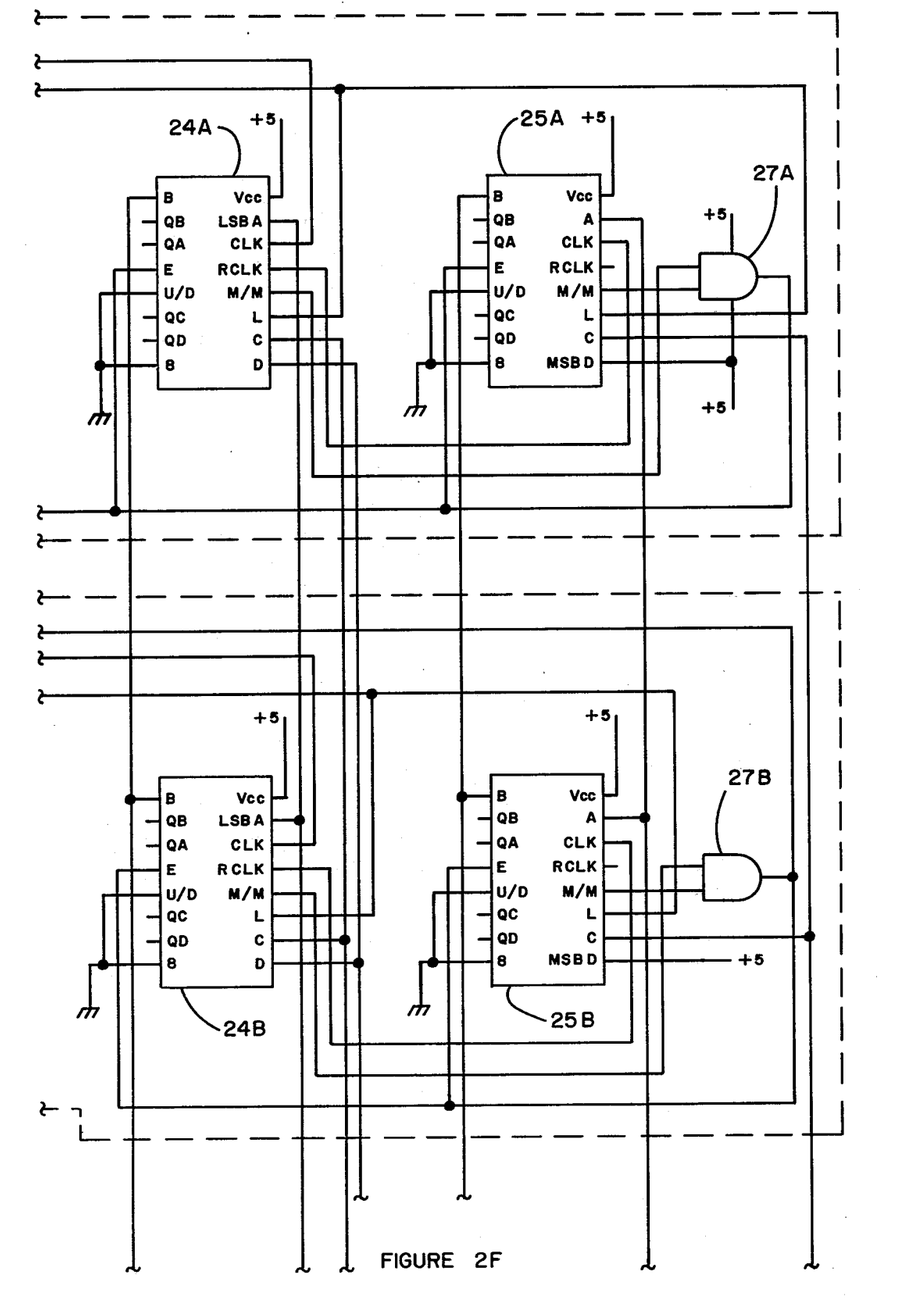
Figure 2G:
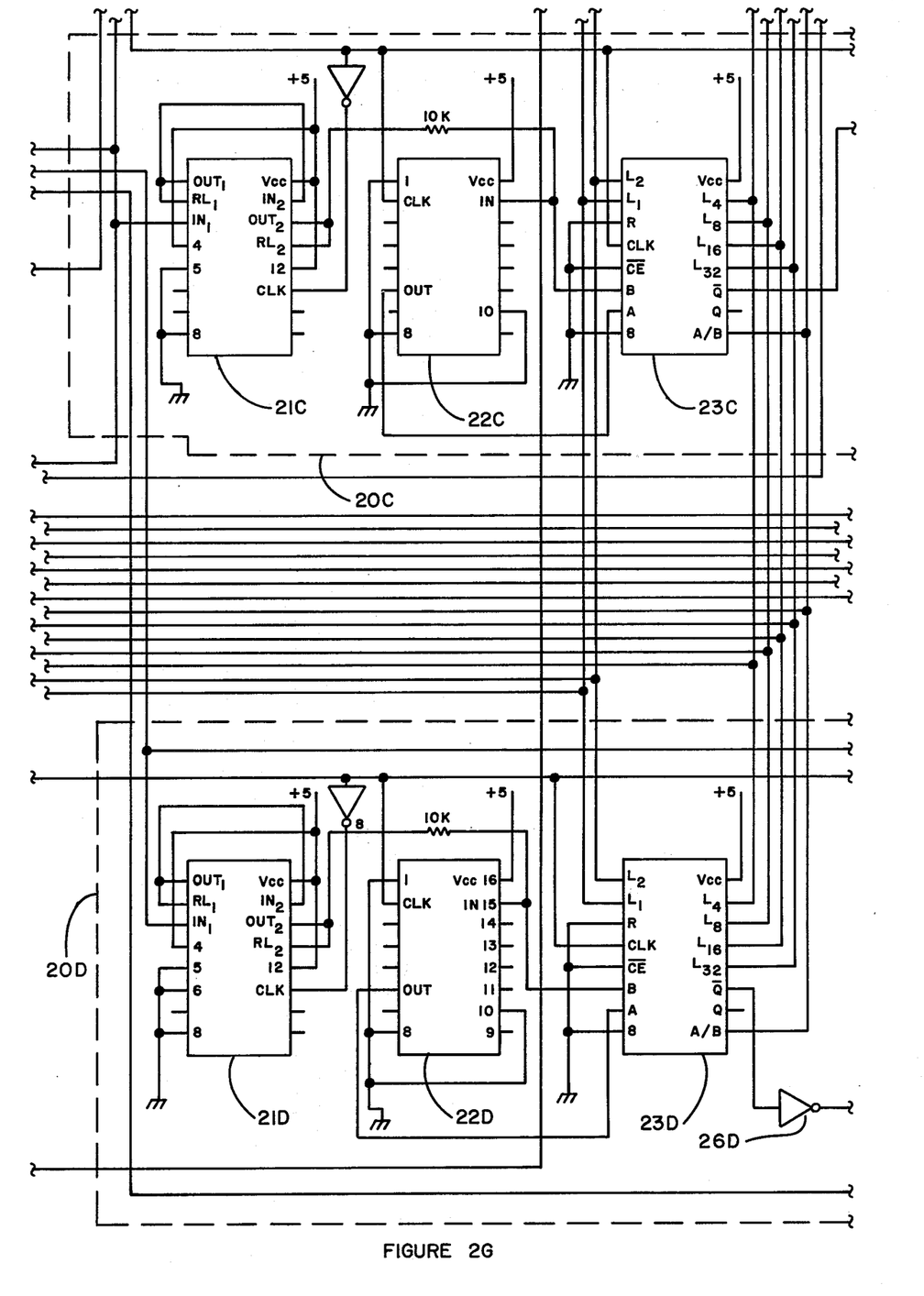
Figure 2H:
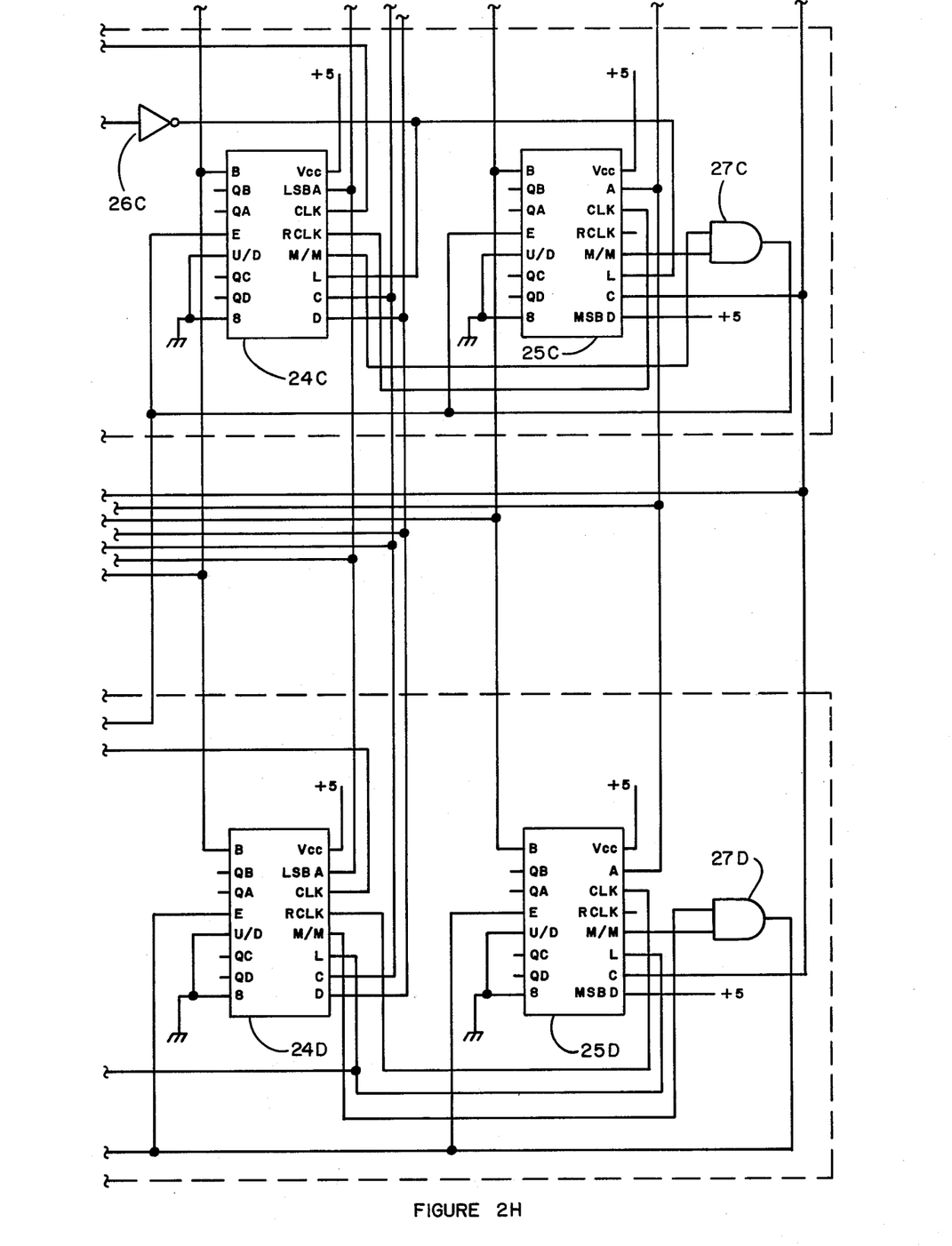
Figure 3:
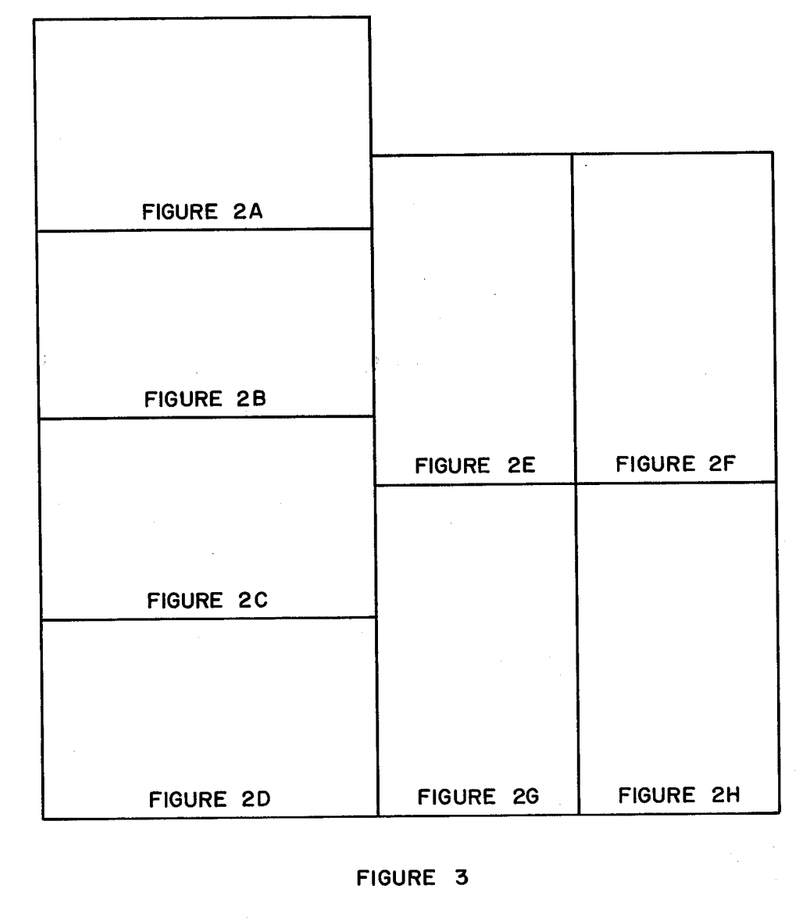

FIG. 1 presents a block diagram of the time-domain filter 10 while FIG. 2 presents a schematic diagram of the time-domain filter. FIG. 3 shows how the various drawings of FIG. 2 should be arranged. In the description of the drawings specific MOS and TTL logic are identified. This is done to better enable one to understand the invention and these specific identifications are not to be construed as limitations on the invention.

The input signal to the filter is delivered from a threshold circuit within a receiver (not shown). The threshold circuit is fed an input signal consisting of a periodic signal buried in a noise environment. The circuit amplifies this signal and provides a TTL level output to be interfaced with the filter. The noise and synchronous pulse signals are fed into the input circuit 11 of the time-domain filter 10.

The input circuit 11 consists basically of a TTL74123 dual one-shot 12 and a bistable multivibrator 13. One of the one shots is fed the input signal and produces, from its leading edges, one microsecond pulses. The clock 30 is fed into the other one shot which produces 40 ns pulses. These two signals are then fed into the bistable multivibrator 13 in order to synchronize the input pulses with the clock pulses.

From the output of the bistable multivibrator 13, the signal goes to the input of the first stage 20A. The time-domain filter has four identical stages 20A, 20B, 20C and 20D within its circuitry. The stages 20A, 20B, 20C and 20D, together with the clock circuit 30, comprise the dynamic data storage circuit. The first stage 20A consists of three shift registers 21A, 22A, 23A and two counters 24A and 25A. Input is made to the first shift register 21A, the Intel 2401, a dual 1024 bit dynamic shift register cascaded to provide 2048 bits while shift register 22A is a 64 bit shift register. The pulses and noise are shifted at the same rate as the previous dual shift register 12. Thus the capability of having 2048 bits +N bits (N=1 to 128 bits, in steps of one bit) of shift is available. Since the variable-length shift register 23A is CMOS, a CD4049 buffer 26 is used to feed the signal into the two parallel TTL74191 4 bit, up/down binary counters. These counters' when enabled count up from a specific programmed value. At their maximum output they produce a high level output pulse with a duration approximately equal to one complete cycle of the clock when the counter overflows or underflows. This output is fed back to the enable of the counter, which requires a low level pulse to allow the counter to start counting. Also to be enabled, there must be a low level pulse on the load pin. Thus, the counter counts a specific amount of time only when it receives a low from the variable-length shift register. Since the counters 24A, 25A are clocked in parallel to provide an 8 bit count, the enables of each are tied together, while the maximum outputs of each are fed into an AND gate 27A. The output of gate 27A goes to the enables of counters 24A and 25A. If after receiving one pulse from the shift registers, a second pulse to the counters reload the initial count, the "window" count will begin again.

Programmable features of the shift registers and counters allow for filter characteristics to be programmed by external means. By use of switches the bits can be placed low or high, thus remotely selecting the length of the shift register and the length of the count. The input pulses are clocked through the shift register at a known rate, changing shift length effectively shifts the center frequency since the operation of the filter is based on the coincidence of the output pulse from the shift register to one that has occurred earlier in time. Also, by changing the length of the count, the bandwidth of the filter is changed.

This pulse information from the shift registers is fed to the counters and causes a window to be created of programmed width. This window is only created when there is a negative edge present on the load input from the shift register. The purpose of this window is to establish a set of limits in which the pulse is expected to occur in order to be within the bandpass of the filter. If the pulse doesn't occur within this window at the predetermined repetition interval, there will be no coincidence and the pulses will not be passed through the filter. Thus, the chance of random noise being passed through the filter is minimized.

Since the counters and shift registers are all clocked at the same rate, the following equation shows the relationship between the clock rate and the filter characteristics:

(# Bits of Delay Per Stage/clock frequency=(1/center frequency)

If more bits are added, then the clock frequency must be raised if the same center frequency of the filter is to be maintained By increasing the number of bits of shift and by increasing the clock frequency, the cell width of the shifted bit is narrowed, thus further minimizing the chance of noise working its way through the filter. This is limited of course to the frequency limit of the logic used.

The four stages 20A, 20B, 20C and 20D are cascaded. Since each stage is operated from the same clock, the outputs of one stage is connected to the input of the next stage. It is the divergence in time of the pulse present in the previous stage with that in the following stages that requires the window width of succeeding stages to be increased.

The frequency of the clock circuit 30 used in the time-domain filter has a direct bearing on the center frequency of the filter. A 316.725KHz crystal oscillator 31 and a TTL74123 frequency doubler 32 are utilized to provide a 633.45KHz clock. This sets the center frequency of the filter at 299.72Hz (633.45KHz/2048+64+1.5) where one half of the variable delay (64) and one half of the minimum bandwidth (1.5) is used.

The oscillator 31 is a crystal-controlled astable multivibrator constructed from two COS/MOS CD4001 NOR gates. The signal is fed into the frequency doubler 32 through a CD4049 buffer 33. The frequency doubler consists of two 74123 monostable multivibrators operated in parallel. An input pulse is fed to the input of each one shot. One is set to trigger on the positive edge, while the other is set to trigger on the negative edge. The Q outputs of each one are put into a 7432 OR gate where the result is a signal of double the frequency of the original signal. Potentiometer 35 should be adjusted to bring the two one shot outputs into phase with each other at the output of gate 34. The 7432 OR gates 36, 37 and 38 are used as clock drivers.

The majority gate circit 40, also known as the correlation logic circuit, evaluates the data available at the output of each shift stage 20A, 20B, 20C and 20D. The operation of the filter requires observing the coincidence of the pulses at a specific time with those that have occurred at previous times. From this, the pulse repetition interval is determined and checked to see if the pulse is contained within the counter window limits. A problem encountered herein is pulse drop out. For example, suppose during a sequence of four pulses, one pulse is missing. If every pulse is required to be present, then four additional samples must be made before a coincidence indication is delivered. If the environment is extremely noisy or if the probability of detection is low, then the chance of a coincidence occurring becomes greater. It therefore, is necessary to provide a means of looking for only a number of pulses for a given sequence. The time domain filter has provisions (switch 48) for selecting two out of four, three out of four, or four out of four pulses to be sampled. Thus, if a pulse is missed occasionally, the sampled data for a given sequence remains valid when two out of four or three out of four is selected.

The majority gate circuit 40 consists of a three input 74151 multiplexer 41 and associated control logic gates 42, 43, 44 and 45. In operation, the output signal A of the first stage 20A, is used to switch the multiplexer 41 depending on the level of the three address inputs MA, MB, and MC to the multiplexer. The inputs are signals B, C and D which are the outputs of stages 20B, 20C and 20D respectively. Control logic TTL 7408 AND gates 42 and 45 and TTL 7432 NOR gates 43 and 44 along with a three position, double-pole switch 48 determines the selection of two out of four, three out of four, or four out of four pulses.

Figure 4:
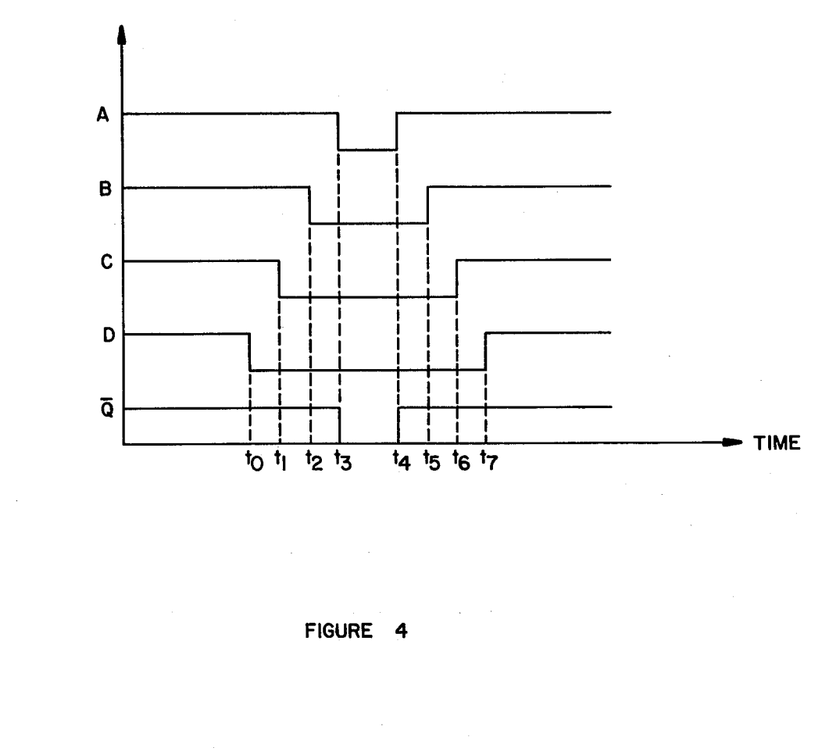
FIG. 4 is a timing diagram of the outputs of the stages and multiplexer of the time-domain filter.

In order to illustrate the operation of the gate 40, suppose that signal A is present and the switch 48 is set to four out of four pulses. This switch setting will be a high on an input pin of gates 44, 43, and 42. Thus signal A appears on $D_0$ while $D_1$, $D_3$, $D_4$, $D_5$, $D_6$ and $D_7$ are held high. Initially, see FIG. 4, the input signals A, B, C and D are high, so the not true $\bar{Q}$ output of the multiplexer gives $\bar{D}_7$ which is low. At time $t_o$ signal D goes low, but signals B, C and A remain high. This makes the $\bar{Q}$ output to $\bar{D}_4$ which also is low. The output stays low. At time $t_1$, signal C goes low with D remaining low, giving $\bar{Q}$ an output of $\bar{D}_6$ which is a low. At time $t_2$, signal B goes low making the $\bar{Q}$ output $\bar{D}_0$ which is low until time $t_3$ when A goes low making $\overline{D}_0$ high. During the time interval $t_4$ thru $t_7$, the process is inversely repeated so that the $\overline{Q}$ output is a positive going pulse of a width equal to that of the first counter output A for the four out of four position. This window width thus is essentially the bandwidth of the filter.

For the three out of four and two out of four cases, the window width increases due to the programming of $D_0$ through $D_7$ by switch 48. This effectively gives a larger bandwidth for three out of four and two out of four, with two out of four having the largest bandwidth.

The programming circuit 50 deternies the bit levels of the variable length shift registers and counters. The circuit consists basically of two sets of seven single pole throw switches 51 and 61 and two TTL7483 four bit adders 62 and 63. One set of switches 61 is used for the bandwidth (or window width) select while the other set 51 is used to change the center frequency of the filter.

The bandwidth switches 61 provides 7 bits to the counter 24A, 24B, 24C, 24D, inputs (which from each stage are connected in parallel to determine the bandwidth of the filter. The "on" position of the switch makes that particular bit go low, while the "off" position leaves the bit as a high. The seven bits are also fed into the B inputs of the two parallel connected adders 62 and 63.

The center frequency switches 51 provide seven bits to the A inputs of the adders 62 and 63 to establish the center frequency of the filter. Similarly the center frequency is inversely proportional to the number of bits of shift.

To maintain the frequency $f_o$ in the center of the bandwidth, the bandwidth switches 61 are set to provide the counters with a count for the entire window width. However, when these same bits are fed to the adders 62 and 63, they are shifted one bit and fed in as one's complements. They are then added to the center frequency $f_o$. This in effect produces the sum ($1/f_o$—window width/2) since the plot is in the time domain. The data is fed to the variable-length shift registers (the data to each stage is connected in parallel) which in turn positions the center frequency exactly halfway between the two window limits.

A light emitting diode 65 is used to indicate an overflow when the number of high bits into the adder is excessive.

A useful option built into the filter is a tuning indicator 70. The tuning indicator 70 gives a visual indication of where within the bandwidth of the filter a signal is present. If the input signal is barely into the window of the filter on the low end, LED 71 will light. If the frequency is almost out of the filter, the LED 72 lights. Tuning into the center of the window presents a flickering between the lower and upper indicators.

A TTL 74123 dual one shot 73 and TTL 7432 OR gates 74, 75. amd 76 comprise the indicator. The lower limit indicator consists of taking the Q output of the second stage variable-length shift register 23B and the Q output of the multiplexer 4 in the majority gate 40 and putting them into OR gate 76. The OR output is fed to input A2 of one shot 73. It there is no coincidence between the bit coming out of the Q output of shift register 23B and the Q output of multiplexer 41, $A_2$ input stays high, and the one shot is never triggered. If there is coincidence, the $A_2$ input goes low. If at this instant there is an input pulse present at the $B_2$ input, then the one shot will trigger causing LED71 to light, indicating that the signal is just within the lower limit of the window.

The upper limit indication operates similarly, only there must be coincidence between the $\overline{Q}$ output of the shift register 23B and the Q output of multiplexer 41 in majority gate 40. If there is coincidence here, then another coincidence must occur between the above signal and the output of the second stage signal B. If there is coincidence, then the $A_1$ input drops low. Now if there is a positive going pulse at the $B_1$ input while $A_1$ is low, the one shot triggers and lights LED72, indicating that the signal present is within the upper limit of the window.

The output gate 80 is a TTL7408 AND gate. The incoming signal from the receiver and the Q output of multiplexer 41 are the inputs to gate 80.

What is claimed:

1. A time-domain filter for extracting known, digital, synchronous pulses from extraneous signals or noise comprising:
   a recursive pulse signal train input;
   a dynamic data storage means for receiving said input signals and which automatically retrieves said input signals that occured in past time at multiples of the pulse repetition time measured in present time and for providing time related outputs comprising:
   clocking means having a frequency higher than the input signal repetition rate and wherein the clock pulses are synchronized with said input pulses, and
   a multi-stage delay wherein the stages are cascaded and each stage is operated by said clocking means, each stage including at least one shift register with delay length such that the pulse input reaches the output of the shift register in slightly less than one pulse repetition time of said recursive pulse signal train input, and a window generator which expands the output from said shift register to form a bandwidth window; a programming circuit comprising:
   bandwidth switching means connected to each of said window generators to provide a variable window width, and
   center frequency switching means for receiving the output of said bandwidth switching means and for providing a shift register of each stage delay with the inverse number of bits of shift such that the center frequency is positioned halfway between the two window limits;
   correlation logic means for receiving the time related outputs of said dynamic data storage means and for generating an output whenever a selected percentage of necessary true inputs is exceeded, said output indicating a probable valid signal; and
   gating means responsive to said correlation logic means for passing said input pulse signal whenever said correlation logic means generates an output indicating a probable valid signal.

2. The time domain filter of claim 1 including a tuning indicator operatively attached to a window generator and providing a visual indication of where within the bandwidth of the filter a signal is present.

* * * * *